United States Patent
Miller, Jr.

[15] 3,655,171
[45] Apr. 11, 1972

[54] BOILER SOOT EXTRACTOR

[72] Inventor: Harry Francis Miller, Jr., 409 W. Lincoln Avenue, Magnolia, N.J. 08049

[22] Filed: Apr. 23, 1969

[21] Appl. No.: 818,597

[52] U.S. Cl. ............................ 261/64 R, 261/105, 261/106, 261/118, 55/233, 55/242
[51] Int. Cl. ........................................................ B01d 47/00
[58] Field of Search .............. 55/233, 234, 242; 261/64, 100, 261/105–107, 115, 116–118, DIG. 9

[56] References Cited

UNITED STATES PATENTS

| | | | |
|---|---|---|---|
| 971,297 | 9/1910 | Miles | 261/DIG. 9 |
| 1,041,617 | 10/1912 | Goodrich | 261/DIG. 9 |
| 1,563,125 | 11/1925 | Ward | 55/257 |
| 2,265,227 | 12/1941 | Coffey | 261/118 X |
| 2,678,701 | 5/1954 | Wright | 35/431 X |
| 3,210,914 | 10/1965 | Eckert | 261/117 X |
| 3,343,341 | 9/1967 | Wiemer | 261/116 |
| 3,492,789 | 2/1970 | Jueng | 261/105 |

Primary Examiner—Tim R. Miles
Assistant Examiner—Steven H. Markowitz
Attorney—Woodcock, Washburn, Kurtz & Mackiewicz

[57] ABSTRACT

Apparatus for filtering particles from exhaust gas which bypasses the gas around its normal path and through a plurality of filter screens and utilizes a plurality of water jets for cleaning the filter screens during the filter's operation.

4 Claims, 2 Drawing Figures

BOILER SOOT EXTRACTOR

BACKGROUND OF THE INVENTION

This invention relates generally to gas filters and more particularly to particle extractors for exhaust gases.

Products of combustion in boilers and the like generally contain particles which are undesirable to be released into the air because of the resulting air pollution. This necessitates in some manner extracting these undesirable particles before such gases may be discharged. Existing filtering apparatus suffers from many inconveniences to the user including being very bulky, mechanically complex, difficult to clean, and difficult to install in existing combustion plants. Among the objects of this invention is to provide a filtering apparatus which overcomes these disadvantages.

A simple and easily installed filtering unit is especially desirable for application to a ship's boiler to extract soot from its vent stack. Various local government regulations do not allow operation of a ship's boiler while in port because of the extensive amount of soot contained in its exhaust gases. Therefore, it is an additional object of this invention to provide a filtering apparatus with particular usefulness for boiler plants of ships.

It is a further object of this invention to provide filtering apparatus which may be cleaned without interrupting its filtering operation upon gases.

It is also an object of this invention to provide filtering apparatus with provision for easily by-passing the gases around the filter.

SUMMARY OF THE INVENTION

These and other objects may be realized in accordance with this invention by providing a filter unit including a plurality of filter screens through which the gases must pass arranged within a filter housing in a manner to cooperate with at least one water spray nozzle for cleaning particles trapped by this screen and with at least one drain provided at the bottom of the filter housing to carry away the particle laden water. The filter screens are preferably placed vertically within the filter housing with one or more spray nozzles placed between each pair of filter screens to apply adequate water pressure to the screens for particle removal. This arrangement allows washing down the filter screens to remove the particles trapped therein without having to by-pass the gases around the filter screens or without having to shut down the boiler creating the particle laden gases. Such a water spray may also serve as a filtering element which removes the gas or smoke itself. Also, water may be introduced through the nozzles to cool the filter unit.

Such a filter unit is placed in a by-pass around a section of the pipe normally carrying particle laden gases and a baffle is inserted in this portion of the pipe to so divert the gases through the filter unit and back to the pipe again for a normal discharge into the atmosphere. This baffle is equipped with damper doors for opening the normally blocked pipe passage, thereby routing the gases around the filter unit. This may be desirable when the filter unit is to be removed or for replacement of parts or for some other purpose.

A preferred form of this invention includes a horizontal section of connecting pipe for joining the filter unit and a vent stack. The connecting pipe preferably includes a bolted flange section for easy removal of the filtering unit. The baffle is placed within the vent stack and positioned in approximately the center of the connecting pipe with a divider extending from this baffle through the connecting pipe and into the filter unit. The divider cooperates with the filter housing to provide a passage within the filter unit for gas to pass from one side of the divider to its other side in a position furthest removed from the vent stack. Thereby a path for the exhaust gases is formed wherein the baffle and divider divert the gas flow into the filter unit with a return to the vent stack on the opposite side of the baffle and divider. The plurality of filter screens are placed on both sides of the divider plate, extending therefrom to an internal surface of the filter housing. Water spray nozzles are appropriately located between the filter screens for cleaning. Appropriate drains are provided at the bottom of the filter housing for gravity removal of the particle laden water.

This particular arrangement of the preferred form of this invention provides that particles or soot removed from the exhaust gases will not fall back into the vent stack, thereby to prevent hot spots which are caused by accumulation of soot in a boiler economizer section and at expansion joints in the vent stack. This also reduces vent stack cleaning to a minimum. Furthermore, this unit has only one mechanical part where damper doors are installed in the baffle, thereby reducing the possibility of malfunction and necessity for maintenance of the unit.

Such a filtering unit as installed in a vent stack is especially useful for installation in existing boiler plants and the only modification necessary is to provide a hole in the vent stack and install a baffle therein. Such a unit is especially useful for installation aboard existing ships since it may be placed above deck, thus avoiding costly installation in crowded mechanical equipment rooms below deck.

While the scope of this invention is defined in the appended claims, it may be best understood by reference to the following description of a preferred embodiment taken in conjunction with the accompanying drawings.

DESCRIPTION OF THE PREFERRED EMBODIMENT

Figure 1:
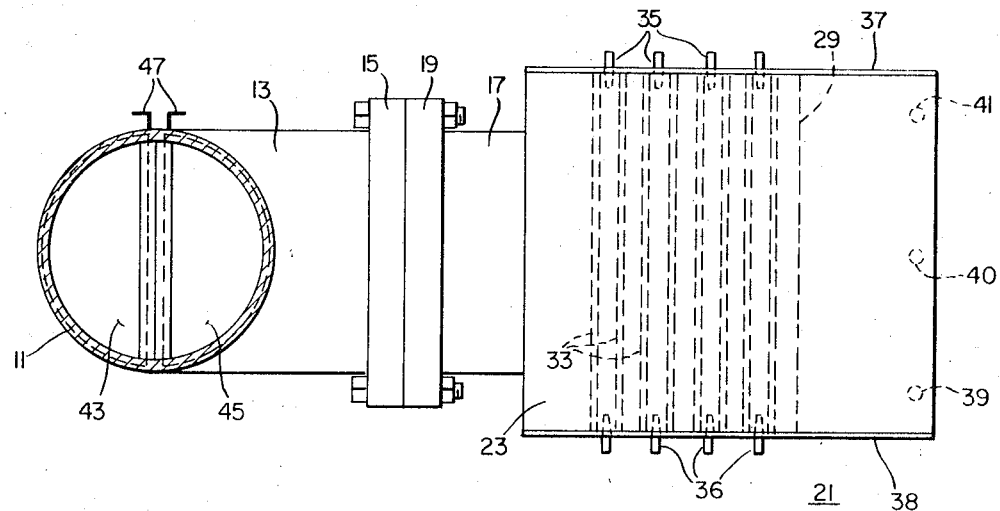
FIG. 1 is a top view of a filter unit according to this invention connected to a vertical vent stack.

Referring to FIG. 1, a vertical section of a vent stack 11 normally discharges the particle laden exhaust gases into the atmosphere. A hole is placed in the side of the vent stack 11 and a short piece of connecting pipe 13 is permanently attached thereto. The connecting pipe 13 has a flange 15 at its end for matching with a second section of connecting pipe 17 having a flange 19 connected thereto. The pieces of connecting pipe are joined at their flanges by bolting in a conventional manner. To the connecting pipe 17 is rigidly attached a filter unit 21 with a filter housing 23 formed of sheet metal in a boxlike shape.

Figure 2:
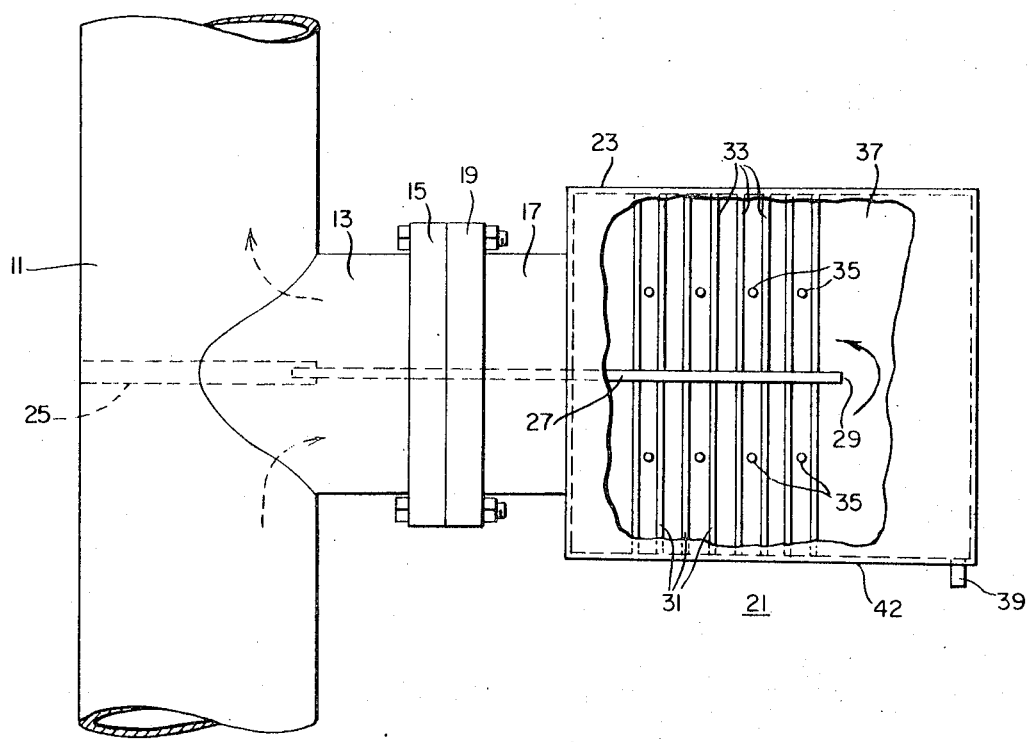
FIG. 2 is a side view, partly broken away of the filtering apparatus shown in FIG. 1.

Referring to FIG. 2, a baffle 25 is placed within the vent stack at a position approximately in the middle of the connecting pipe 13. To the baffle 25 is connected a divider 27 which divides the connecting pipes 13 and 17 and the filter housing 23 into two volumes. As shown by the arrows in FIG. 2, the gases are diverted by the baffle 25 and the divider 27 into a first volume of the filter unit 21 and then around an end 29 of the divider 27 to a second volume of the filter unit and out again through the vent stack.

In the path of the diverted gases are located a plurality of filter screens 31 in the first volume of the filter unit and an equal number of filter screens 33 in the second volume of the unit. A plurality of water jets 35 are provided alternately between the filter screens along one side of the filter unit in a manner that one jet may serve to wash the pair of filter screens surrounding the jet. If the screens are wide enough so that water jets located at only one side thereof are not sufficient for washing of the screens, a second set of water jets 36 may be located at a side of the filter unit opposite that of the jets 35. The water jets penetrate side plates 37 and 38 of the filter housing which are removable for cleaning of the water jets and removal of the filter screens which are slidably inserted into the filter housing.

Drains 39, 40 and 41 are provided on bottom plate 42 of the filter housing which is sloped toward the drains to carry away the water introduced through the water jets into the filter unit. Additionally, the divider 27 is sloped somewhat to provide for water drainage around its end 29 and out through the drains 39, 40 and 41. The drains will also serve to remove any rain water which may be introduced into the vent stack and may be connected to a building's usual drainage system.

As is apparent from FIG. 1, the baffle 25 is provided with damper doors 43 and 45 which may be opened by external handles 47 to allow the exhaust gases to escape directly through the vent stack without being diverted into the filter unit. The filter unit may then be removed or maintenance performed thereon without hot gases passing there-through.

In the case of shipboard installations, a boiler soot extractor according to the present invention may most conveniently be installed along a usual horizontal section of vent stack that extends along and immediately above the deck. Such a location is convenient for installation and maintenance. A soot extractor for installation on a horizontal section of vent stack may be similar to that described herein with respect to FIGS. 1 and 2 after appropriate modifications to maintain water drainage from the filter unit. The drains of a shipboard filter unit may be connected to a common pipe extending overboard.

It shall be understood that the invention is not limited to the specific arrangements shown, and that changes and modifications may be made within the scope of the appended claims.

What is claimed is:

1. Apparatus for filtering particles from exhaust gases escaping through a vent stack, comprising:
    a filter housing adapted for connection to said vent stack in a manner that said gases may be diverted from the vent stack into the filter housing through an opening of said vent stack,
    a planar dividing plate extending within said filter housing and positioned to form two volumes of substantially the same size on either side of said plate, said plate being connected with a baffle within said vent stack, thereby to divert gases from the vent stack into said filter housing,
    said dividing plate forming with said filter housing a passage at the end of said dividing plate furthest from said vent stack for gases to pass to an opposite side of said dividing plate (from one volume to the other), thereby to allow gases diverted into said housing to return to said vent stack, and
    a plurality of filter screens with substantially the same outside dimensions inserted between said plate and an inner surface of said housing in each of said volumes.

2. Apparatus for filtering particles from exhaust gases escaping through a vent stack, comprising:
    a filter housing adapted for connection to said vent stack in a manner that said gases may be diverted from the vent stack into the filter housing through an opening of said vent stack,
    a dividing plate extending within said filter housing and connected with a baffle within said vent stack, thereby to divert gases from the vent stack into said filter housing, said baffle additionally includes a damper plate adjustable between opened and closed positions,
    said dividing plate forming with said filter housing a passage at the end of said dividing plate furthest from said vent stack for gases to pass to an opposite side of said dividing plate, thereby to allow gases diverted into said housing to return to said vent stack, and
    a plurality of filter screens inserted between said plate and an inner surface of said housing.

3. Apparatus according to claim 2 wherein said filter housing includes a bolted flange for connection with said vent stack.

4. Apparatus according to claim 1 which additionally includes,
    a plurality of water spray nozzles individually attached to said housing disposed between said filter screens, each of said nozzles additionally positioned to direct water into said filter housing from the vicinity of a wall of said housing, and
    a drain opening in said filter housing for carrying away water introduced through said spray nozzles.

* * * * *